United States Patent [19]

Baumann

[11] Patent Number: 4,793,407

[45] Date of Patent: Dec. 27, 1988

[54] HEAT EXCHANGER FOR TWO FLUID MEDIA

[75] Inventor: Dieter Baumann, Greven-Gimbte, Fed. Rep. of Germany

[73] Assignee: Ing. Walter Hengst GmbH & Co. KG, Münster, Fed. Rep. of Germany

[21] Appl. No.: 41,865

[22] Filed: Apr. 23, 1987

[51] Int. Cl.$^4$ .............................................. F28D 7/02
[52] U.S. Cl. .................................... 165/165; 165/164
[58] Field of Search ........................ 165/165, 74, 164

[56] References Cited

U.S. PATENT DOCUMENTS

| | | | |
|---|---|---|---|
| 1,796,509 | 3/1931 | Daley | 165/74 X |
| 3,161,234 | 12/1964 | Rannenberg | 165/165 X |
| 3,552,488 | 1/1971 | Grill et al. | 165/165 X |

FOREIGN PATENT DOCUMENTS

| | | | |
|---|---|---|---|
| EP0040890 | 12/1981 | European Pat. Off. | 165/165 |
| 651026 | 2/1924 | France | 165/165 |
| 2367265 | 10/1976 | France | 165/165 |
| 215482 | 5/1924 | United Kingdom | 165/165 |
| 1016313 | 1/1966 | United Kingdom | 165/165 |

Primary Examiner—Ira S. Lazarus
Assistant Examiner—P. Neils
Attorney, Agent, or Firm—Felfe & Lynch

[57] ABSTRACT

The invention relates to a heat exchanger for two fluid media, especially liquids, having a housing which can be closed with a cover and which has a core for separately carrying the two media under heat exchange, at least the core being able to be produced by pressure casting. The core (3) is formed essentially of a train of walls in a meandering configuration which form the passages for the two media in the form of tall, narrow chambers, while the one medium and the other flow alternately through adjacent chambers. The chambers are divided into partial chambers disposed in two planes through which the fluid flows successively, by a common partition wall (34) which divides all the chambers vertically and is integral with the train of walls.

7 Claims, 3 Drawing Sheets

HEAT EXCHANGER FOR TWO FLUID MEDIA

BACKGROUND OF THE INVENTION

The invention relates to a heat exchanger for two fluid media, especially liquids, having a housing which can be closed with a cover, and which has inlets and outlets for the two media, and a core for the separate carrying of the two media under heat exchange, at least the core being able to be manufactured as a die-casting.

A heat exchanger of the kind referred to is described in an older proposal of the Applicant (Patent Application No. P 35 42 721.3). In this heat exchanger the passages for carrying the two media are formed in a core which can be made by die casting, and in their height these passages extend over the entire height of the core. For an effective heat exchange, the walls of the passages must be as thin as possible, and the width of the passages, i.e., the distance between adjacent walls, must be as small as possible, since only in this manner are advantageously short heat conduction paths achieved. In the heat exchanger according to the above-referenced older proposal, there is the great disadvantage that if the requirement just described is satisfied, the core is difficult to manufacture or cannot be manufactured economically. This is due to the fact that the ratio of the wall height to the wall thickness or wall spacing is very great, and that therefore the distances over which the molten metal must run and the depth from which the casting must be drawn to extract it from the mold (mold stripping length) becomes very great. In the casting process it can very easily happen that the mold is not entirely filled, resulting in a high rate of rejection. The great mold stripping lengths require greater force in the stripping of the castings, which entails the danger of damage to the thin-walled casting and hence also an increase in the number of rejects.

The problem therefore presents itself of creating a heat exchanger of the kind specified above, which will avoid the recited disadvantages and which especially will have desirable casting characteristics. Furthermore, an effective heat exchange between the two media is to be assured, and the heat exchanger is to be adaptable in a simple manner to different applications.

SUMMARY OF THE INVENTION

The solution of this problem is achieved according to the invention by a heat exchanger of the kind described above, in which the core is formed substantially by a train of walls of a zig-zag configuration forming the passages for the two media in the form of tall, narrow chambers, the one medium flowing through one chamber and the other through the other, adjacent chamber, and in which the chambers are each divided by a common partition integral with the train of walls dividing all chambers vertically into partial chambers disposed in two levels, the fluid flowing successively through those partial chambers.

With the configuration of the core that has been described it is advantageously brought about that the mold stripping lengths and the distances over which the casting metal must run to form the walls of the core, preferably aluminum or aluminum alloy, are substantially shortened. In particular, the partition wall integral with the train of walls can be used as a central path for the flow of the molten casting metal when it is injected into the mold. Thus the distance which the molten metal has to travel is reduced to about half of the former distance, while the dimensions of the core otherwise remain approximately the same, so that the problems involved in production are largely eliminated.

In order to carry the media flowing successively through the partial chambers in as simple and uncomplicated a manner as possible from one partial chamber to the next, provision is made such that, at least in the chambers for one of the two media, the partition wall is made so as to leave openings situated at one end of the chambers. Since only a small part of the partition wall is occupied by these openings, this results in no disadvantage to the casting of the core.

For the attainment of a very simple construction and to assure an effective heat exchange between the media, the inlets and outlets of the two media are connected, one through an inlet manifold and the other to an outlet manifold to the ends of the partial chambers of one level. In this manner the streams are distributed to a number of partial chambers in which the heat exchange substantially takes place, as well as a reconfluence of the streams of the two media thereafter. The two media can advantageously be made to flow in opposite directions to establish full countercurrent operation.

An additional possibility for securing an effective heat exchange consists in lengthening the path of flow of at least one of the two media. For this purpose, in one embodiment of the heat exchanger the partial chambers for one of the two media are divided into partial chambers disposed in four levels by partition walls running parallel to the main partition wall, leaving an opening on the side opposite the inlet and outlet side. For the same throughput of the medium the result will be to double the time of stay in the heat exchanger, or, for the same time of stay the throughput can be approximately doubled.

Provision is furthermore made in the embodiment just described for the partial chambers of the two middle levels to be in communication with one another through a bypass disposed outside of the core. This offers the advantage that, in the designing of the heat exchangers according to this embodiment, the main part, namely the core, does not need to be altered. The changes consist only in the retrofitting of the additional partition walls and the arrangement of the external bypass. An especially advantageous application of this embodiment, which is desirable from the manufacturing viewpoint, is achieved by integrating into the cover the inlet, inlet manifold, bypass, outlet manifold and outlet for the medium flowing through the partial chambers disposed in four levels. In addition, the additional partition walls can be made integral with the cover, which is possible since the cover can also be manufactured by the pressure casting method.

For the other medium flowing through the heat exchanger, the inlet, inlet manifold, outlet manifold and outlet are best integrated into the bottom of the housing. This also brings it about that, for different applications using, for example, different positions of the inlet and-/or outlet of the heat exchanger, only the housing bottom has to be adapted, while the core can remain unchanged. This permits a flexible use of the heat exchanger in many fields of application.

Lastly, one more embodiment is proposed, whereby the adaptability of the heat exchanger, especially to different properties of the media, is improved. This embodiment consists in making some of the meanders of the zig-zag walls shorter, at least in the area of the passages for the collection and distribution of one of the two media, and the two adjacent, unshortened meanders are connected together at the end by an end partition wall which is disposed at a distance from the end wall of the short meander in question and is integral with the train of walls, and simultaneously defines the inlet manifold and the outlet manifold, while leaving an inlet opening from the inlet manifold and an outlet opening to the outlet manifold. In this manner the flow path of one of the media or even for both of the media can be considerably lengthened.

Which of the possible embodiments of the heat exchanger is used in a concrete application will depend on a number of factors, such as the required throughput, the thermal conductivity of the media, their viscosity etc., and will be governed according to the particular case. Because of the ease with which it can be manufactured by casting, and its flexible adaptability, the heat exchanger is suitable for a number of applications.

BRIEF DESCRIPTION OF THE DRAWING

A preferred embodiment of the invention will be explained below in conjunction with a drawing. The figures of the drawing are as follows.

DETAILED DESCRIPTION OF PREFERRED EMBODIMENT

Figure 1:
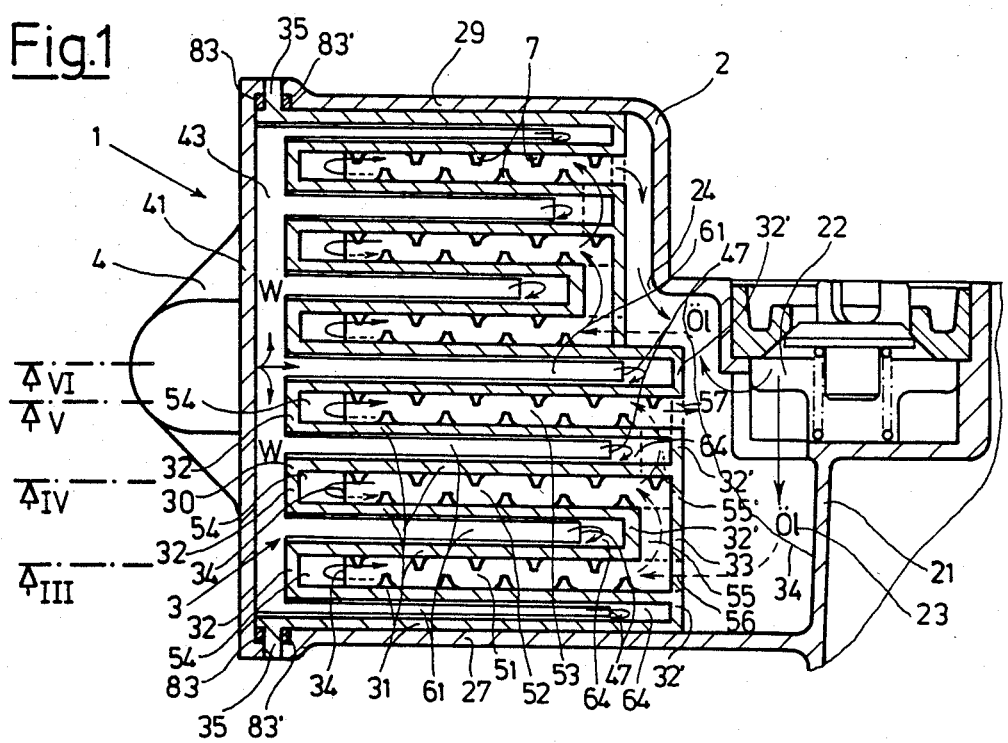
FIG. 1 shows a horizontal section through a heat exchanger according to the invention.

The embodiment of the heat exchanger 1 represented in FIG. 1 is a water-oil heat exchanger, which can be used, for example, with water-cooled internal combustion engines. As FIG. 1 shows, the heat exchanger consists essentially of a housing 2, a core 3 inserted in the latter, and a cover 4 with which the housing is closed. The housing 2 has a bottom 21 as well as four sidewalls of which the walls 27 and 29 are visible in the present cross-sectional view. The term, bottom, in this case refers to the side of the housing remote from the cover it does not refer to the orientation of the heat exchanger in space. Its orientation is actually entirely optional, and depends only on the circumstances in which it is used.

The core 3 is formed essentially of a train 30 of walls of a meandering or zig-zag cross-sectional configuration, which is composed of longitudinal walls 31 disposed parallel to one another and end walls 32 and 32' joining them together at alternate ends. In this manner, chambers are created alternately for one medium and the other between the walls, e.g., the chambers 51 to 53 for the one medium, oil in this case, and chambers 61, for example, for the other medium, which in this case is water.

At the bottom end a number of walls of the train 30 are shortened, i.e., the end wall 32' is train back from the adjacent end walls 32'. At the same time the adjacent end walls 32' are connected together by an end partition wall 33. This end partition wall 33 together with the bottom 21 of the housing 2 defines an inlet manifold 23 for the oil reaching it from the engine, for example, through an inlet 22, as well as an outlet manifold 24 for the oil, from which it is carried away through an outlet (not shown). A portion of the inflowing oil passes from the inlet manifold 23 through an inlet opening 56 into the chambers serving for the heat exchange, whose construction will be described in conjunction with FIGS. 3 to 5. After flowing through the chambers the oil passes through an outlet opening 57, which is also disposed in the end partition wall 33, into the outlet manifold 24 from which, as already mentioned, it passes to the outlet that is not shown.

On the opposite side of the core 3, i.e., at the cover 4, can be seen an inlet manifold 43 for the water, which from there is distributed into the water-bearing chambers 61. The construction of the water-bearing chambers 61 will be further explained later on with the aid of FIG. 6.

Figure 2:
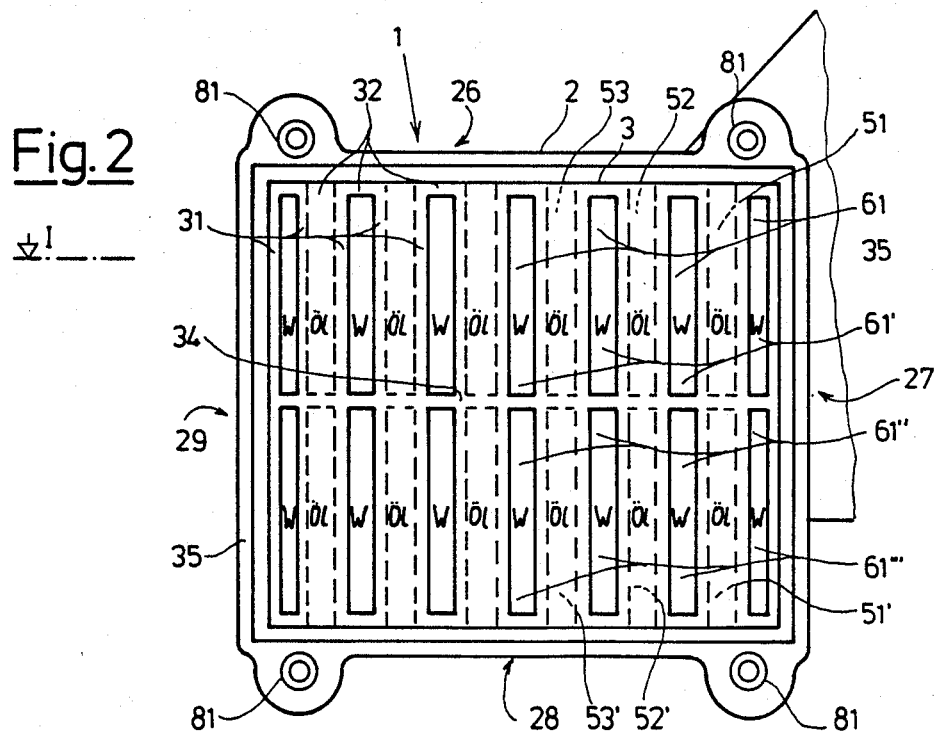
FIG. 2 is a front elevation of the heat exchanger from FIG. 1 with the cover removed.

In FIG. 2, which shows a front elevation of the core 3 of the heat exchanger 1 with the cover 4 removed, the arrangement of the chambers for the two media in two levels can be seen with special clarity. The two levels are separated from one another by a partition wall 34 which is perpendicular to the longitudinal walls 31 and parallel to the end walls 32 of the meandering train of walls. By the partition wall 34, the original height of the chambers is halved, and partial chambers disposed in the two levels are formed. The oil-bearing chambers, of which chambers 51 to 53 are numbered by way of example in the upper level and the chambers 51' to 53' in the lower level, are tightly closed on the cover side, while the water-bearing chambers on the cover side are open. The water-bearing chambers differ in the two levels after every two partial chambers, the partial chambers in the upper level being numbered 61 and 61', while in the lower level the partial chambers are marked 61'' and 61'''. As it will be explained in connection with FIG. 6, the separation of the water-bearing chambers is accomplished by partition walls 47 inserted between the partial chambers 61, 61' and 61'', 61''', respectively, which are preferably made integrally with the cover 4. For this reason these partition walls are no longer visible in FIG. 2 after removal of the cover 4.

Also to be seen in FIG. 2 is the circumferential margin 35 of the core 3 by which the core 3 is supported on the upper margin of the housing 2 by its sidewalls 26 to 29. Four taps 81 are distributed on the circumference of the housing 2 and its margin 35, into which screws can be driven to join together the cover 4, core 3 and housing 2.

Figure 3:
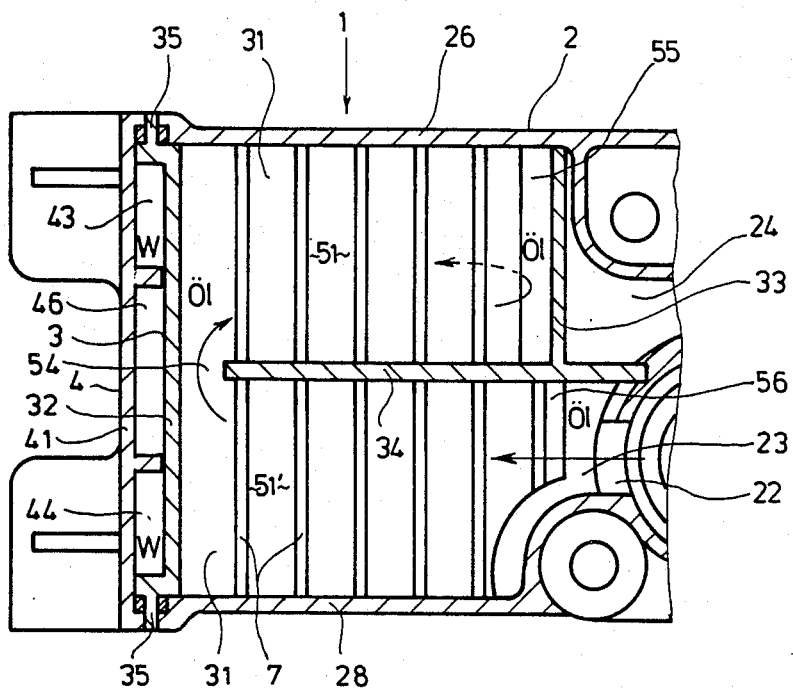
FIG. 3 is a vertical section along line III through the heat exchanger from FIG. 1.
Figure 4:
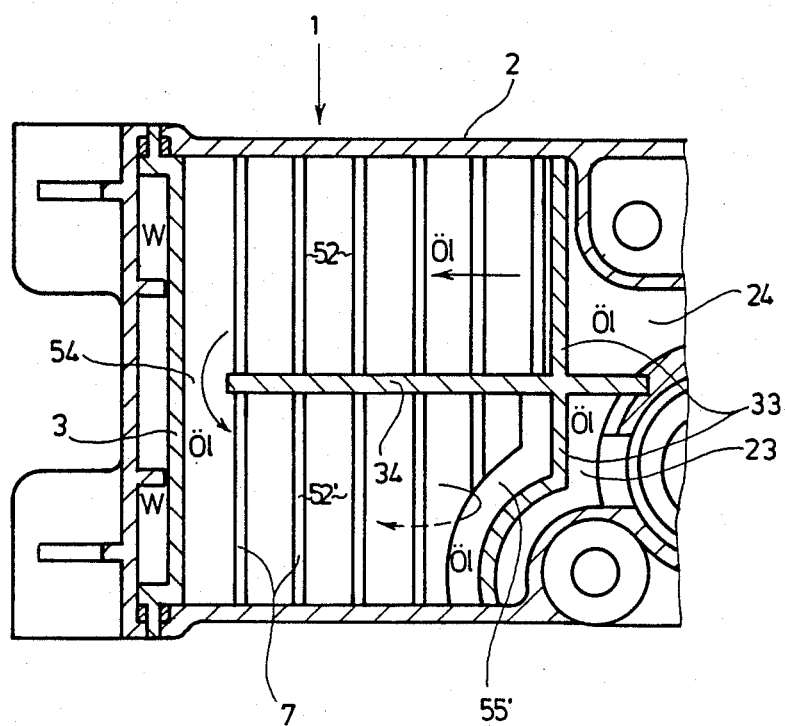
FIG. 4 is a vertical section along line IV through the heat exchanger from FIG. 1.
Figure 5:
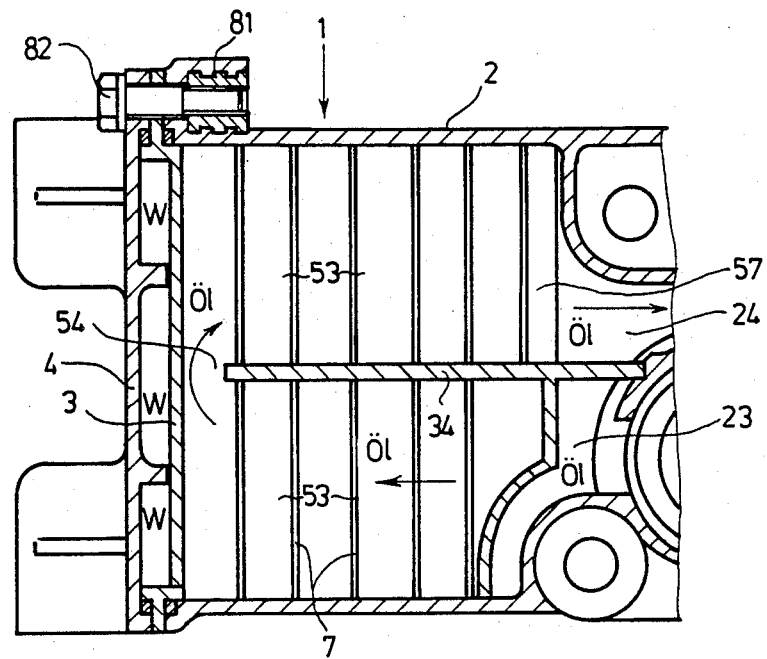
FIG. 5 is a vertical section along line V through the heat exchanger from FIG. 1.

FIGS. 3 to 5 show a series of vertical sections through the heat exchanger 1, which are taken each through adjacent oil-bearing chambers. The section shown in FIG. 3 runs along line III in FIG. 1, the section in FIG. 4 along line IV in FIG. 1, and the section in FIG. 5 along the line V in FIG. 1.

FIG. 3 shows, as do FIGS. 4 and 5, the housing 2 of the heat exchanger 1 with its sidewalls 26 and 28, the core 3 with its circumferential margin 35 and the cover 4 which closes the housing 2 and clamps the core 3 between itself and the housing 2. In the cover 4 are water-bearing passages 43, 46 and 44, whose function will be explained later on. In the core 3 can be seen one of the longitudinal walls 31. Perpendicular to them and in their center runs the partition wall 34, whereby an oil-bearing chamber 51 is formed in the upper level and a chamber 51' in the lower level.

The course taken by the oil through the heat exchanger will now be explained by way of example with the aid of FIG. 3 and the next two figures. As it can be seen in the lower right part of FIG. 3, the oil passes from the inlet 22 through the inlet manifold 23 and the inlet opening 56 first into chamber 51' in the lower level. After flowing through the latter the oil reaches the cover-side end of the chamber 51' through the opening 54 in the chamber 51 disposed above it. From there the oil flows through the bypass opening 55 into the next oil-bearing chamber below it, as seen in the viewing direction of the cross section. The direct return of the oil into the outlet manifold 24 is prevented by the end partition wall 33.

The continued path of the oil through the heat exchanger can be followed in FIG. 4. After the oil has left the chamber 51 in the upper level through the bypass opening 55 (see FIG. 3), it enters into the chamber 52 parallel to the chamber 51, which is also in the upper level. After flowing through this chamber 52, the oil runs again through an opening 54 into chamber 52' which is disposed in the lower level underneath chamber 52. The oil leaves this chamber through the bypass opening 55' which is disposed on the bottom end of the chamber 52' and is divided off from the inlet manifold 23 for the oil by the end partition wall 33.

As it can be seen in FIG. 5, the oil coming from the bypass opening 55' enters into chamber 53' in the lower level, and after flowing through it passes again through another opening 54 into the chamber 53 disposed above it. After flowing through this chamber the oil passes through the outlet opening 57 into the outlet manifold 24 from which it runs to the outlet, e.g., to the engine crankcase.

As it can be seen in FIGS. 3 to 5, the length of the flow path of the oil in the represented embodiment is about six times as great as the length of a single oil chamber, so that an intensive heat exchange is assured.

In FIG. 5 can also be seen the manner in which the housing 2, core 3 and cover 4 are assembled by means of a screw 82 driven through the cover 4 and the core 3 into a tap 81 in the housing 2.

Figure 6:
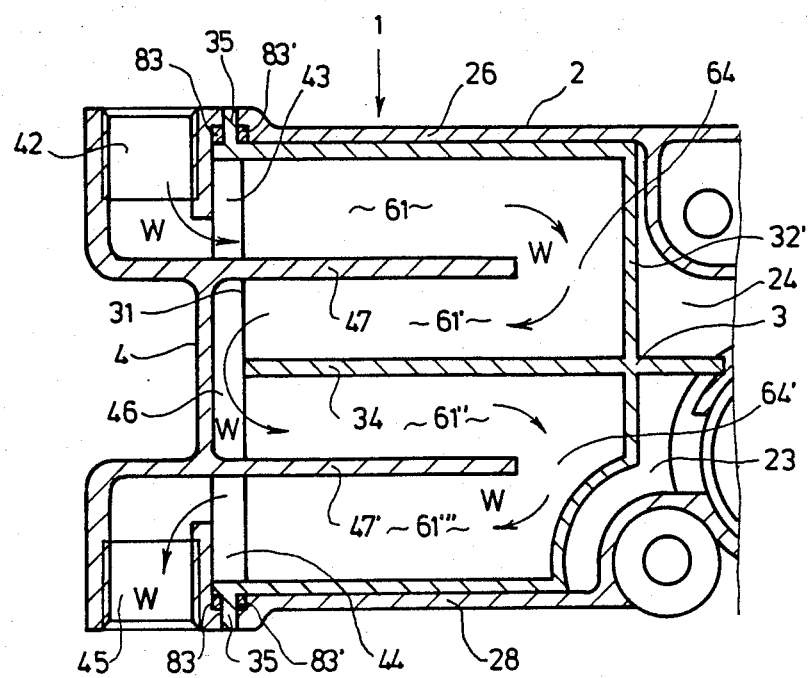
FIG. 6 is a vertical section along line VI through the heat exchanger from FIG. 1.

Lastly, FIG. 6 shows a section through the heat exchanger parallel to the sections in FIGS. 3 to 5 along line VI in FIG. 1, but this time through a system of water-bearing chambers. As FIG. 6 shows, the water runs through a series of four partial chambers 61 to 61''' disposed one over the other. The central partition wall is the wall 34 already mentioned, which is made integral with the core 3 and also runs through the oil-bearing chambers. In addition to the partition wall 34, partition walls 47 and 47' are disposed on either side thereof and are made in one piece with the cover 4. The water runs through an inlet 42 in cover 4 first into the inlet manifold 43. From there the water is distributed to the water-bearing chambers, a portion of the water flowing into the partial chamber 61 represented in FIG. 6. After flowing through this chamber the water passes at the end of chamber 61 remote from the cover through an opening 64 in the next chamber 61' below it. From this chamber the water flows through a bypass 46 integrated into the cover into the next chamber 61'' below and from there through another opening 64' into the bottom-most chamber 61'''. From here the water flows through an outlet manifold 44 to an outlet 45. At the ends remote from the cover the chambers 61 to 61''' are each segregated by end walls 32' from the oil distributing channel 23 and the collecting channel 24.

As it can be seen from the figures, there can be no mixing of oil and water in the heat exchanger 1, since the only sealed joint that has to be made during the assembly of the parts is at the circumferential margin 35 of the core 3. Within the core 3 and housing 2, oil and water are always separated from one another by continuous walls. The sealing at the circumferential margin 35 of the core 3 is best accomplished by resilient sealing rings 83 and 83'. If a leak should occur at this point, the medium in question can escape only to the outside of the housing, but cannot get into the passage carrying the other medium. Thus mixing together of the two media and the harmful consequences possibly resulting therefrom are securely avoided.

As it can be seen in FIGS. 1 and 3 to 5, ribs 7 are provided, which run across the direction of movement of the oil and project from the walls defining the oil-bearing chambers. These provide for a turbulent flow of the oil and thus for an intensive heat exchange and transport of heat within the flowing oil. Thus the formation within the oil of a temperature gradient disadvantageous to good thermal exchange is reliably prevented.

In addition to the represented embodiment using two triple groups of oil-bearing chamber systems connected in parallel, the heat exchanger according to the invention can also be constructed with a greater number of chambers without thereby departing from the scope of the invention. In its application, the heat exchanger according to the invention can be used either as a separate component or in combination with other parts, such as the oil filter of an internal combustion engine, for example.

It will be understood that the specification and examples are illustrative but not limitative of the present invention in that other embodiments within the spirit and scope of the invention will suggest themselves to those skilled in the art.

I claim:

1. A heat exchanger for two fluid media, especially liquids, comprising:
   a cover;
   a housing closable with said cover and having inlets and outlets for two fluid media;
   two fluids media;
   a core in said housing for the separate carrying of the two media with heat exchange, at least the core being manufacturable as a pressure casting, said core being formed substantially of a train of walls running zig-zag and forming vertically long, narrow adjacent chambers;
   one medium and the other medium flowing alternately through said adjacent chambers, a common horizontal partition wall integral with said train of walls and dividing all of said chambers vertically into partial chambers disposed in two levels through which said media successively flow.

2. A heat exchanger according to claim 1, in which in at least in those of said chambers for one of said two media said partition wall leaves free passage openings running from one end of said chambers for one of said two media.

3. A heat exchanger according to claim 1, which includes inlet manifolds connected to said inlets for said media and which includes outlet manifolds connected to said outlets for said two media.

4. A heat exchanger according to claim 1, which includes partition walls running parallel to said common partition wall and in which those of said chambers for one of said two media are divided into partial chambers disposed in four levels by said partition walls running parallel to said common partition wall, leaving in each case an opening remote from an inlet side and an outlet side.

5. A heat exchanger according to claim 4, which includes a portion disposed outside the core and in which the partial chambers of two middle levels are each in communication with one another through said portion.

6. A heat exchanger according to claim 5, in which the inlet, inlet manifold, bypass, outlet manifold and the outlet for the one medium flowing through partial chambers disposed in the four levels are integral with said cover.

7. A heat exchanger according to claim 6, in which said housing has a bottom and in which the inlet, inlet manifold, outlet manifold and outlet for the other medium flowing through the partial chambers in two levels are integrated into said bottom of said housing.

* * * * *

UNITED STATES PATENT AND TRADEMARK OFFICE
CERTIFICATE OF CORRECTION

PATENT NO. : 4,793,407

DATED : December 27, 1988

INVENTOR(S) : Dieter Baumann

It is certified that error appears in the above-identified patent and that said Letters Patent is hereby corrected as shown below:

Column 6, line 64 for "media" read -- two media --.

Signed and Sealed this

Fourth Day of September, 1990

Attest:

HARRY F. MANBECK, JR.

*Attesting Officer*  *Commissioner of Patents and Trademarks*